US011420384B2

(12) United States Patent  
Thompson et al.

(10) Patent No.: US 11,420,384 B2  
(45) Date of Patent: Aug. 23, 2022

(54) SELECTIVE CURING ADDITIVE MANUFACTURING METHOD

(71) Applicant: General Electric Company, Schenectady, NY (US)

(72) Inventors: Mary Kathryn Thompson, North Huntingdon, PA (US); Nagashiresha G, Bangalore (IN); Tyler A. Griffith, Cincinnati, OH (US); Herbert Chidsey Roberts, III, Middletown, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 819 days.

(21) Appl. No.: 15/723,907

(22) Filed: Oct. 3, 2017

(65) Prior Publication Data

US 2019/0099942 A1  Apr. 4, 2019

(51) Int. Cl.
*B33Y 10/00* (2015.01)
*B29C 64/165* (2017.01)

(52) U.S. Cl.
CPC ............ *B29C 64/165* (2017.08); *B33Y 10/00* (2014.12)

(58) Field of Classification Search
None
See application file for complete search history.

(56) References Cited

U.S. PATENT DOCUMENTS 4,575,330 A  3/1986 Hull
4,752,498 A  6/1988 Fudim
5,026,146 A  6/1991 Hug et al.
5,096,530 A  3/1992 Cohen
5,126,529 A  6/1992 Weiss et al.
5,174,931 A  12/1992 Almquist et al.
5,192,559 A  3/1993 Hull et al.
(Continued)

FOREIGN PATENT DOCUMENTS

CN  1950192 A  4/2007
CN  104859152 A  8/2015
(Continued)

OTHER PUBLICATIONS

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.
(Continued)

*Primary Examiner* — Alison L Hindenlang
*Assistant Examiner* — Debjani Roy
(74) *Attorney, Agent, or Firm* — Dority & Manning, P.A.

(57) ABSTRACT

A method for producing a component layer-by-layer include the steps of: depositing a layer of particulate material having a first area over a build platform; applying a radiant-energy-curable binder to the layer so that a selected portion of the first area is uniformly coated with binder; selectively curing a second area of the layer smaller than the selected portion of first area, using an application of radiant energy in a specific pattern that defines the geometry of a cross-sectional layer of the component; and repeating the steps of depositing, applying, and curing for a plurality of layers until the component is complete.

34 Claims, 4 Drawing Sheets

(56) References Cited

U.S. PATENT DOCUMENTS

| | | |
|---|---|---|
| 5,203,944 A | 4/1993 | Prinz et al. |
| 5,204,055 A | 4/1993 | Sachs et al. |
| 5,258,146 A | 11/1993 | Almquist et al. |
| 5,340,656 A | 8/1994 | Sachs et al. |
| 5,387,380 A | 2/1995 | Cima et al. |
| 5,432,045 A | 7/1995 | Narukawa et al. |
| 5,496,682 A | 3/1996 | Quadir et al. |
| 5,626,919 A | 5/1997 | Chapman et al. |
| 5,650,260 A | 7/1997 | Onishi |
| 5,660,621 A | 8/1997 | Bredt |
| 5,697,043 A | 12/1997 | Baskaran et al. |
| 5,718,279 A | 2/1998 | Saoth et al. |
| 5,807,437 A | 9/1998 | Sachs et al. |
| 5,851,465 A | 12/1998 | Bredt |
| 5,940,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,376,148 B1 | 4/2002 | Liu et al. |
| 6,401,002 B1 | 6/2002 | Jang et al. |
| 6,403,002 B1 | 6/2002 | van der Geest |
| 6,423,255 B1 * | 7/2002 | Hoechsmann ......... B33Y 10/00 264/113 |
| 6,471,800 B2 | 10/2002 | Jang et al. |
| 6,500,378 B1 | 12/2002 | Smith |
| 6,596,224 B1 | 7/2003 | Sachs et al. |
| 6,780,368 B2 | 8/2004 | Liu et al. |
| 6,850,334 B1 | 2/2005 | Gothait |
| 6,896,839 B2 | 5/2005 | Kubo et al. |
| 6,930,144 B2 | 8/2005 | Oriakhi |
| 6,966,960 B2 | 11/2005 | Boyd et al. |
| 6,986,654 B2 | 1/2006 | Imiolek et al. |
| 7,008,209 B2 | 3/2006 | Iskra et al. |
| 7,052,263 B2 | 5/2006 | John |
| 7,087,109 B2 | 8/2006 | Bredr et al. |
| 7,270,528 B2 | 9/2007 | Sherwood |
| 7,300,613 B2 | 11/2007 | Sano et al. |
| 7,455,804 B2 | 11/2008 | Patel |
| 7,550,518 B2 | 6/2009 | Bredt et al. |
| 7,578,958 B2 | 8/2009 | Patel et al. |
| 7,767,132 B2 | 8/2010 | Patel et al. |
| 7,785,093 B2 | 8/2010 | Holmboe et al. |
| 7,795,349 B2 | 9/2010 | Bredt et al. |
| 7,815,826 B2 | 10/2010 | Serdy et al. |
| 7,867,302 B2 | 1/2011 | Nevoret et al. |
| 7,892,474 B2 | 2/2011 | Shkolnik et al. |
| 8,071,055 B2 | 9/2011 | Davidson et al. |
| 8,110,135 B2 | 2/2012 | El-Siblani |
| 8,157,908 B2 | 4/2012 | Williams |
| 8,096,262 B2 | 6/2012 | Ederer et al. |
| 8,211,226 B2 | 7/2012 | Bredt et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,649 B1 | 10/2013 | Balistreri et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,655,639 B2 | 2/2014 | Xu |
| 8,658,076 B2 | 2/2014 | El-Siblani |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,844,133 B2 | 8/2014 | Fuller |
| 8,845,316 B2 | 9/2014 | Schillen et al. |
| 8,845,953 B1 | 9/2014 | Balistreri et al. |
| 8,876,513 B2 | 11/2014 | Lim et al. |
| 8,926,304 B1 | 1/2015 | Chen |
| 8,968,625 B2 | 3/2015 | Tan |
| 8,991,211 B1 | 3/2015 | Arlotti et al. |
| 8,998,601 B2 | 4/2015 | Busato |
| 9,067,359 B2 | 6/2015 | Rohner et al. |
| 9,101,321 B1 | 8/2015 | Kiesser |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,259,880 B2 | 2/2016 | Chen |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,429,104 B2 | 8/2016 | Fuller |
| 9,434,107 B2 | 9/2016 | Zenere |
| 9,463,488 B2 | 10/2016 | Ederer et al. |
| 9,469,074 B2 | 10/2016 | Ederer et al. |
| 9,487,443 B2 | 11/2016 | Watanabe |
| 9,498,920 B2 | 11/2016 | DeSimone et al. |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,529,371 B2 | 12/2016 | Nakamura |
| 9,545,753 B2 | 1/2017 | Costabeber |
| 9,561,622 B2 | 2/2017 | Das et al. |
| 9,578,695 B2 | 2/2017 | Jerby et al. |
| 9,579,852 B2 | 2/2017 | Okamoto |
| 9,592,635 B2 | 3/2017 | Ebert et al. |
| 9,604,411 B2 | 3/2017 | Rogren |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,670,371 B2 | 6/2017 | Pervan et al. |
| 9,676,143 B2 | 6/2017 | Kashani-Shirazi |
| 9,682,166 B2 | 6/2017 | Watanabe |
| 9,682,425 B2 | 6/2017 | Ku et al. |
| 10,766,246 B2 | 9/2020 | Nauka et al. |
| 2002/0149137 A1 | 10/2002 | Jang et al. |
| 2003/0214571 A1 * | 11/2003 | Ishikawa ............... B29C 64/135 347/255 |
| 2005/0059757 A1 * | 3/2005 | Bredt .................... B29C 64/165 524/3 |
| 2007/0187117 A1 * | 8/2007 | Tanaka .................. B29C 64/153 172/1 |
| 2010/0003619 A1 | 1/2010 | Das et al. |
| 2010/0323301 A1 | 12/2010 | Tang |
| 2014/0103581 A1 | 4/2014 | Das et al. |
| 2014/0227123 A1 | 8/2014 | Gunster et al. |
| 2014/0275317 A1 | 9/2014 | Moussa |
| 2015/0140152 A1 | 5/2015 | Chen |
| 2015/0224710 A1 | 8/2015 | El-Siblani |
| 2015/0355553 A1 | 12/2015 | Allanic |
| 2016/0096332 A1 | 4/2016 | Chen et al. |
| 2016/0107387 A1 | 4/2016 | Ooba et al. |
| 2016/0129631 A1 | 5/2016 | Chen et al. |
| 2016/0221262 A1 | 8/2016 | Das et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0100895 A1 | 4/2017 | Chou et al. |
| 2017/0100897 A1 | 4/2017 | Chou et al. |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136708 A1 | 5/2017 | Das et al. |
| 2018/0126668 A1 * | 5/2018 | El-Siblani ............ B29C 64/255 |
| 2018/0311728 A1 * | 11/2018 | Kottilingam ............ B22F 3/10 |

(56) References Cited

U.S. PATENT DOCUMENTS

2019/0270254 A1* 9/2019 Mark .................... B29C 64/245
2020/0101534 A1* 4/2020 Gibson ................ B29C 64/165
2020/0261974 A1* 8/2020 Tsunoya ................. B22F 10/14

FOREIGN PATENT DOCUMENTS

| CN | 105254309 A | 1/2016 |
| CN | 107206622 A | 9/2017 |
| EP | 0882568 B1 | 3/2002 |
| JP | 2002/292751 A | 10/2002 |
| JP | 2017/087612 A | 5/2017 |
| JP | 2017127999 A | 7/2017 |
| WO | 9806560 | 2/1998 |
| WO | 2014/199062 | 12/2014 |
| WO | 2014/200595 | 12/2014 |
| WO | WO2018026962 A1 | 2/2018 |

OTHER PUBLICATIONS

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.
Lee et al., Large-Area Compatible Laser Sintering Schemes with a Spatially Extended Focused Beam, www.mdpi.com/journal/micromachines., Article May 11, 2017, Micromachines, Seoul University, Seoul, Korea.
Extended European Search Report issued in connection with corresponding EP Application No. 18194596 5 dated Mar. 18, 2019.
European Office Action issued in connection with corresponding EP Application No. 18194596.5 dated Jul. 3, 2020.

* cited by examiner

SELECTIVE CURING ADDITIVE MANUFACTURING METHOD

BACKGROUND OF THE INVENTION

This invention relates generally to additive manufacturing, and more particularly to methods for applying and selectively curing a binder in an additive manufacturing process.

Additive manufacturing is a process in which material is built up layer-by-layer to form a component, as opposed to conventional manufacturing in which material is machined away from a piece of stock to form a component. Additive manufacturing is also referred to by terms such as "layered manufacturing," "rapid manufacturing," "freeform manufacturing,", and "3D printing". Such terms are treated as synonyms for purposes of the present invention.

One category of prior art additive manufacturing process works by selectively binding a powder by depositing a liquid binder onto a build area in a pattern that defines the boundaries of the finished component. The binder is applied, for example, by a moving print head having a plurality of very fine nozzles. The binder is cured non-selectively, by inputting energy into the entire build area.

One problem with these types of prior art additive manufacturing processes is that they can be slow, because the binder is applied from a linear source (a print head) that is moved across a planar surface and the binder must be cured between layers. In addition, these types of prior art additive manufacturing processes tend to have relatively poor precision because the pattern is defined by the binder droplets from the print head. A faster moving print head is likely to have less precise placement of the binder. Larger volumes of binder required are likely to have larger pixel sizes. In addition, the spread of the binder (pixel size) is hard to control because it is influenced by how the binder soaks into the material.

BRIEF DESCRIPTION OF THE INVENTION

At least one of these problems is addressed by a method of additive manufacturing in which the binder is selectively cured.

According to one aspect of the technology described herein, a method for producing a component layer-by-layer include the steps of: depositing a layer of particulate material having a first area over a build platform; applying a radiant-energy-curable binder to the layer so that a selected portion of the first area is uniformly coated with binder; selectively curing a second area of the layer smaller than the selected portion of first area, using an application of radiant energy in a specific pattern that defines the geometry of a cross-sectional layer of the component; and repeating the steps of depositing, applying, and curing for a plurality of layers until the component is complete.

According to another aspect of the technology described herein, a method for producing a component layer-by-layer includes the steps of: depositing a layer of particulate material premixed with a radiant-energy-curable binder over a build platform, the layer covering a first area; selectively curing a selected portion of the layer smaller than the first area, using an application of radiant energy in a specific pattern that defines the geometry of a cross-sectional layer of the component; and repeating the steps of depositing and curing for a plurality of layers until the component is complete.

According to another aspect of the technology described herein a method for producing a component layer-by-layer includes: depositing a layer including a particulate material, a first binder curable at a first radiant energy wavelength, and a second binder curable at a second radiant energy wavelength over a build platform, the layer covering a first area; wherein at least one of the binders of the layer is deposited so that a selected portion of the first area is uniformly coated with the at least one binder; curing the first and second binders by application of radiant energy at the first and second wavelengths, wherein at least one of the binders is selectively cured in a second area of the layer smaller than first area, using radiant energy in a specific pattern that defines the geometry of a cross-sectional layer of the component; and repeating the steps of depositing, and curing for a plurality of layers until the component is complete.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
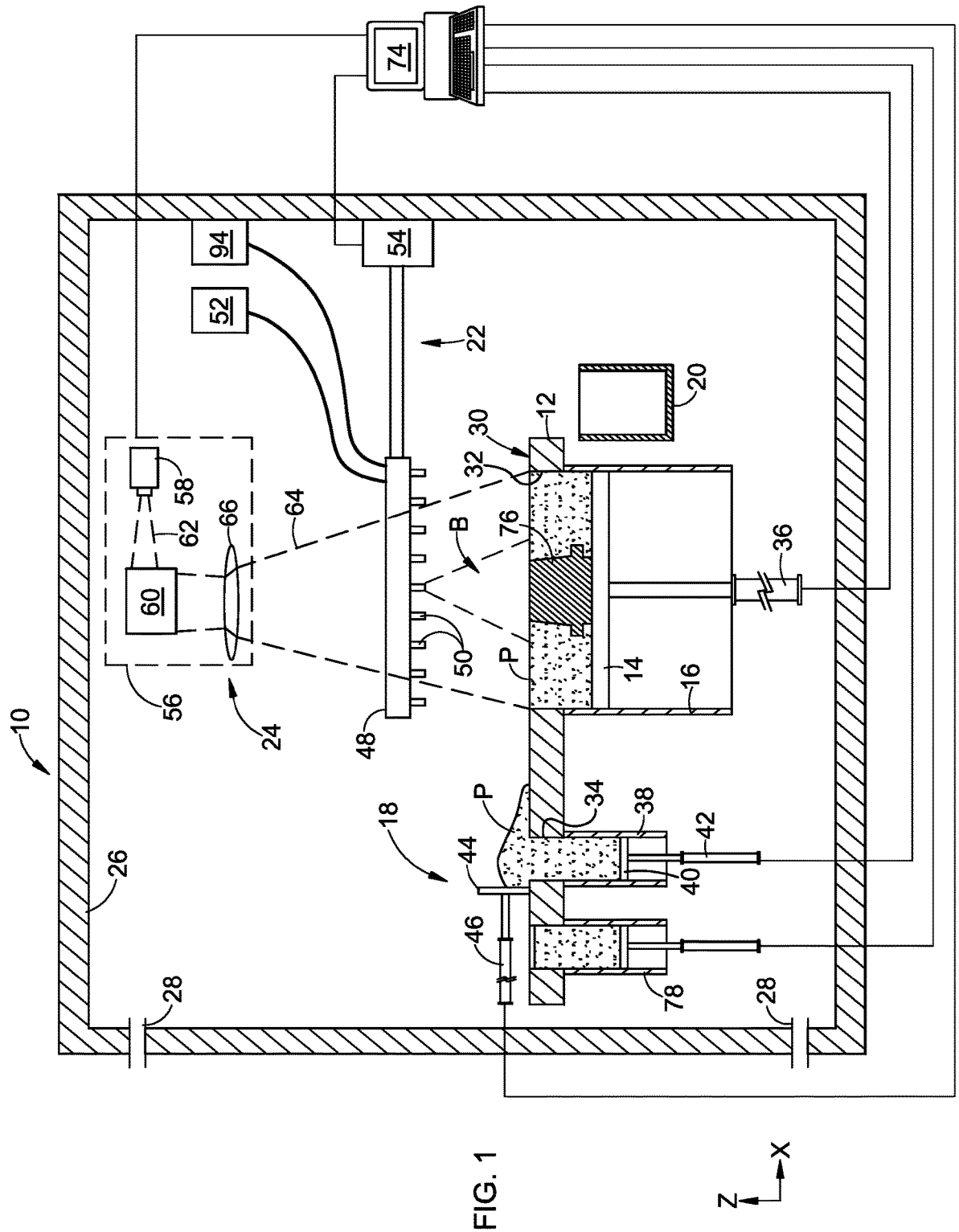
FIG. 1 is a schematic diagram illustrating an exemplary additive manufacturing apparatus.

Referring to the drawings wherein identical reference numerals denote the same elements throughout the various views, FIG. 1 illustrates schematically an example of one type of suitable apparatus 10 for carrying out an additive manufacturing method as described herein. As will be explained in more detail below, it will be understood that other configurations of equipment may be used to carry out the method described herein. Basic components of the exemplary apparatus 10 include a table 12, a build platform 14 surrounded by a build chamber 16, a particulate material supply 18, an overflow container 20, a binder applicator 22, and a radiant energy apparatus 24. Optionally, the components of the apparatus 10 may be surrounded by a housing 26, which may be used to provide a shielding or inert gas atmosphere using gas ports 28. Each of these components will be described in more detail below.

The table 12 is a rigid structure defining a planar worksurface 30. The worksurface 30 is coplanar with and defines a virtual workplane. In the illustrated example, it includes a build opening 32 communicating with the build chamber 16 and exposing the build platform 14 and a supply opening 34 communicating with the particulate material supply 18.

For purposes of convenient description, the plane of the worksurface 30 may be considered to be oriented parallel to an X-Y plane of the apparatus 10, and a direction perpendicular to the X-Y plane is denoted as a Z-direction (X, Y, and Z being three mutually perpendicular directions).

Means may be provided for moving the build platform 14 parallel to the Z-direction. In FIG. 1, these means are depicted schematically as a simple actuator 36, with the understanding devices such as pneumatic cylinders, hydraulic cylinders, ballscrew electric actuators, or linear electric actuators may be used for this purpose.

The particulate material supply 18 may be any device or combination of devices which is operable to apply a layer of particulate material "P" to the worksurface and to level the particulate material P. In the example shown in FIG. 1, the particulate material supply 18 comprises a supply container 38 underlying and communicating with the supply opening 34, and an elevator 40. The elevator 40 is a plate-like structure that is vertically slidable within the supply container 38. It is connected to an actuator 42 (shown schematically) operable to selectively move the elevator 40 up or down. When the elevator 40 is lowered, a supply of particulate material P may be loaded into the supply container 38. When the elevator 40 is raised, it exposes the particulate material P above the worksurface 30.

In the illustrated example, the particulate material supply 18 includes a recoater 44 which is a rigid, laterally-elongated structure that lies on the worksurface 30. It is connected to an actuator 46 (shown schematically) operable to selectively move the recoater 44 along the worksurface 30, to move particulate material P from the supply container 38 and to level it in the build chamber 16. It is noted that there are known configurations for particulate material supply in which a build chamber is not used or required; for example, the build chamber may be simply eliminated, or the apparatus 10 may be used to build sacrificial chamber walls as part of the build process.

Other types of particulate material supplies may be used; for example, one or more rollers (not shown) may be provided to move and level the particulate material P. Alternatively, the particulate material may be leveled by vibrating the build chamber 16. Alternatively, particulate material P may be applied by dropping it into the build chamber 16 by an overhead device (not shown). Depending on the type of particulate material supply used, it may be provided with means for movement parallel to the Z-axis, and the build platform 14 may remain stationary during the build process.

The binder applicator 22 may be any device or combination of devices which is operable to apply a layer of binder B over the particulate material P in the build chamber 16. In contrast to prior art hardware and methods, the boundaries of the applied binder do not define the boundaries of the completed component, therefore the binder applicator 22 need not be capable of applying the binder with any specific level of accuracy. The binder applicator 22 may be configured to apply binder B over the entire exposed surface area of the particulate material P, or it may be configured to apply binder B over a smaller, predetermined area, as described in more detail below. In either case, the binder B is generally applied such that there is more surface area of binder applied than there will be surface area of cured binder.

Nonlimiting examples of suitable binder application devices include chutes, hoppers, pumps, spray nozzles, spraybars, or precision spraying devices such as inkjet printheads.

Figure 2:
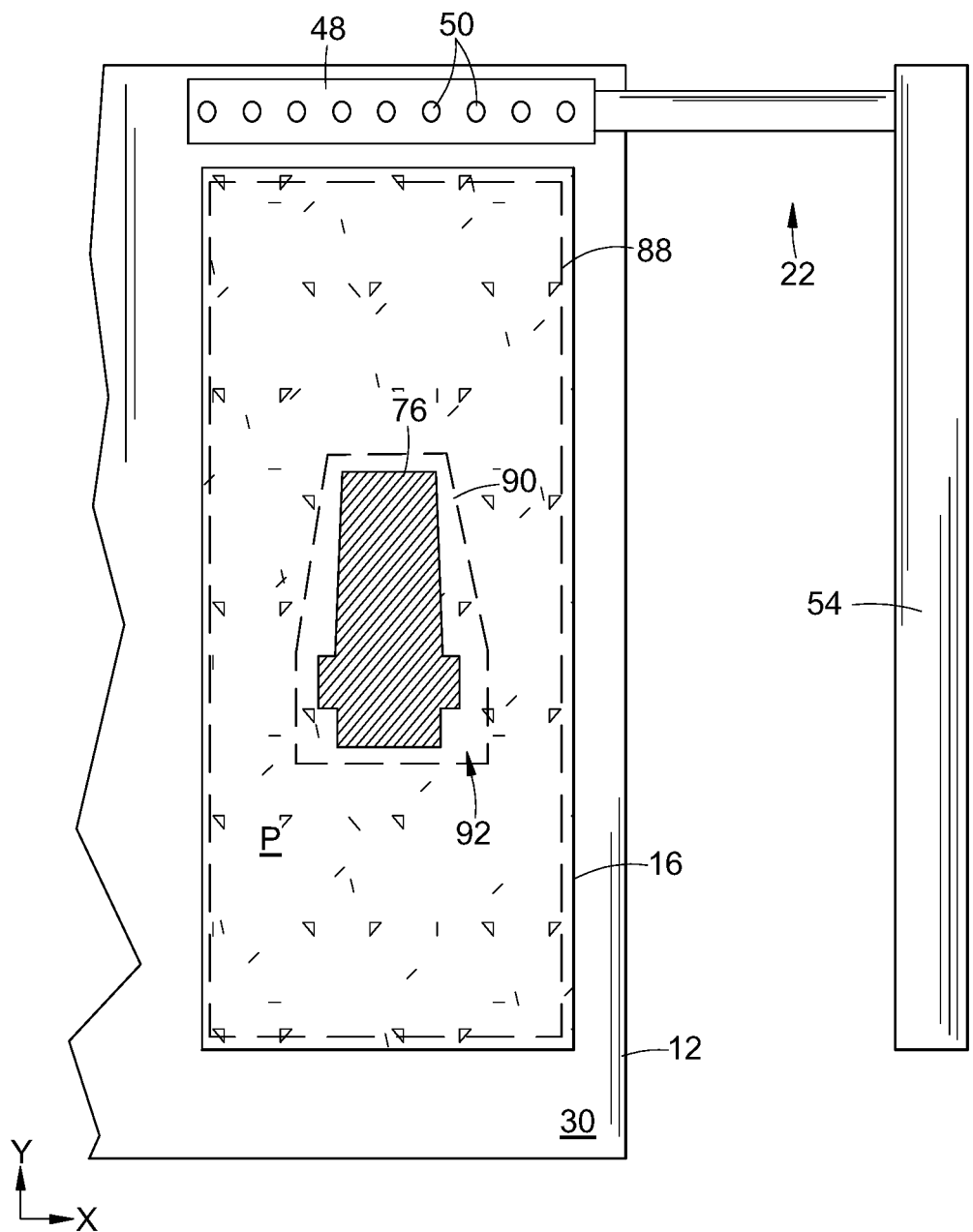
FIG. 2 is a schematic top plan view of a portion of the apparatus of FIG. 1.

FIGS. 1 and 2 show one possible configuration of the binder applicator 22. A spraybar 48 carrying a plurality of spaced-apart spray nozzles 50 is mounted above the build chamber 16. A supply of a suitable binder is contained in a binder reservoir 52 which is connected in fluid communication with the spraybar 48. The spraybar 48 may incorporate valving enabling the spray nozzles 50 to be opened or closed individually or in one or more groups.

The spraybar 48 is mounted to an actuator 54 permitting selective motion along an axis perpendicular to the long axis of the spraybar 48 and parallel to the worksurface 30 (e.g. the Y-axis). Coordinated operation of the spray nozzles 50 and the actuator 54 will permit the application of binder over the build chamber 16 in arbitrary patterns.

The radiant energy apparatus 24 may comprise any device or combination of devices operable to generate and project radiant energy on the particulate material P in a suitable pattern and with a suitable energy level and other operating characteristics to cure the binder B during the build process, described in more detail below.

In one exemplary embodiment as shown in FIG. 1, the radiant energy apparatus 24 may comprise a "projector" 56, used herein generally to refer to any device operable to generate a radiant energy patterned image of suitable energy level and other operating characteristics to cure the binder B. As used herein, the term "patterned image" refers to a projection of radiant energy comprising an array of individual pixels. Nonlimiting examples of patterned imaged devices include a Digital Light Processing ("DLP") projector or another digital micromirror device, a 2D array of LEDs, a 2D array of lasers, or optically addressed light valves. In the illustrated example, the projector 56 comprises a radiant energy source 58 such as a UV lamp, an image forming apparatus 60 operable to receive a source beam 62 from the radiant energy source 58 and generate a patterned image 64 to be projected onto the surface of the particulate material P, and optionally focusing optics 66, such as one or more lenses.

The radiant energy source 58 may comprise any device operable to generate a beam of suitable energy level and frequency characteristics to cure the binder B. In the illustrated example, the radiant energy source 58 comprises a UV flash lamp.

The image forming apparatus 60 may include one or more mirrors, prisms, and/or lenses and is provided with suitable actuators, and arranged so that the source beam 62 from the radiant energy source 58 can be transformed into a pixelated image in an X-Y plane coincident with the worksurface 30. In the illustrated example, the image forming apparatus 60 may be a digital micromirror device. For example, the projector 56 may be a commercially-available DLP projector.

Figure 3:
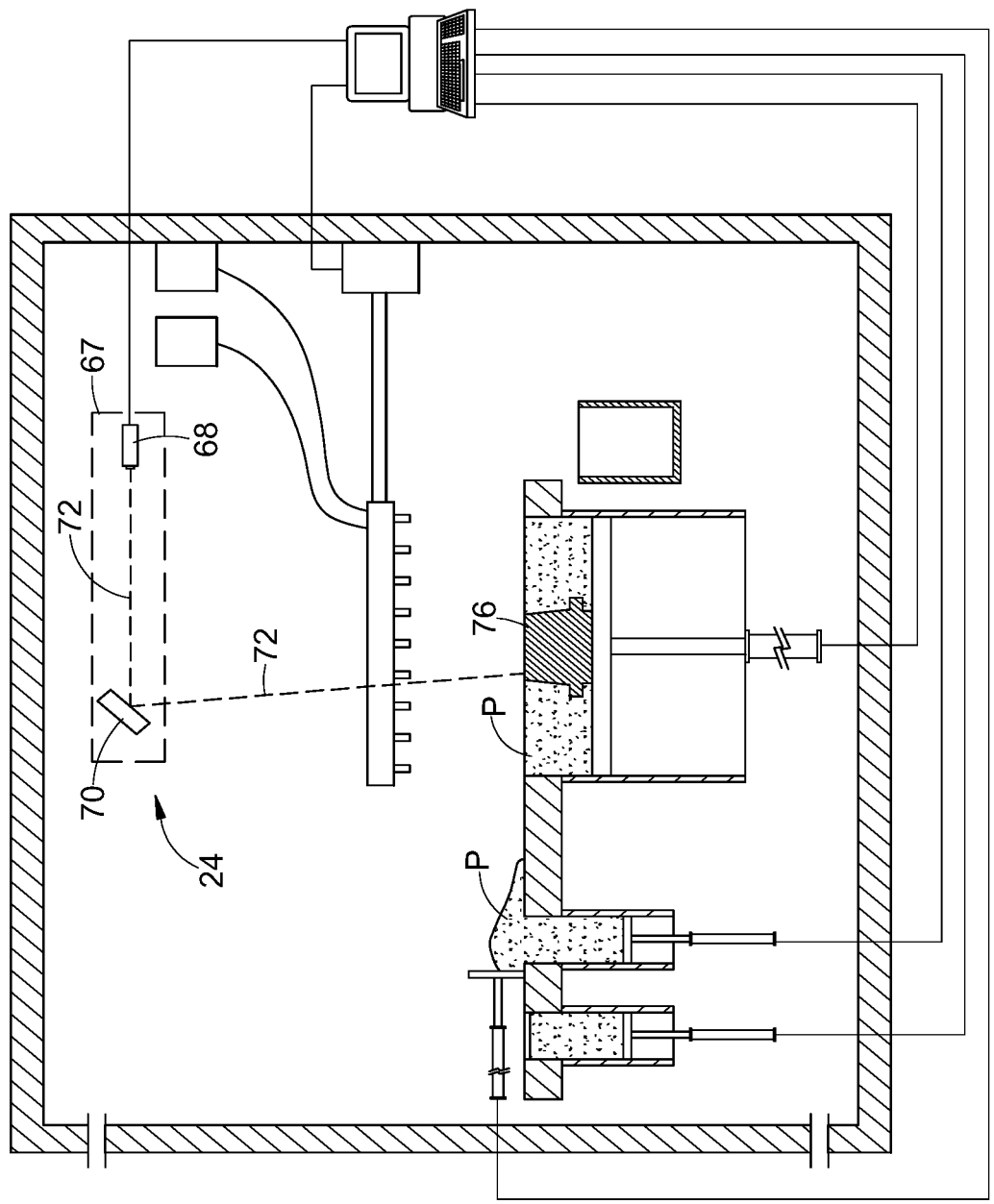
FIG. 3 is a schematic diagram illustrating an alternative additive manufacturing apparatus.

In another exemplary embodiment as shown in FIG. 3, the radiant energy apparatus 24 may comprise a "scanned beam apparatus" 67, used herein to refer generally to refer to any device operable to generate one or more radiant energy beams of suitable energy level and other operating characteristics to cure the binder B and to scan the beam (or beams) over the worksurface 30 in a desired pattern. In the illustrated example, the scanned beam apparatus 67 comprises a radiant energy source 68 and a beam steering apparatus 70.

The radiant energy source 68 may comprise any device operable to generate a beam of suitable power and other operating characteristics to cure the binder. Nonlimiting examples of suitable radiant energy sources include lasers or electron beam guns.

The beam steering apparatus 70 may include one or more mirrors, prisms, and/or lenses and provided with suitable actuators, and arranged so that a beam 72 from the radiant energy source 68 can be focused to a desired spot size and steered to a desired position in plane coincident with the worksurface 30. The beam 72 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 74. The controller 74 in FIG. 1 is a generalized representation of the hardware and software required to control the operation of the apparatus 10, including some or all of the particulate material supply 18, the binder applicator 22, the radiant energy apparatus 24, and the various actuators described above. The controller 74 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

The particulate material P literally comprises particles, which are conventionally defined as "a very small bit of matter". The particulate material P may comprise any material which can be laid down in a substantially flat layer and which is chemically and physically compatible with the selected binder. In general, the term "powder", conventionally defined as "dry material made up of fine particles", may be considered a synonym for the term particulate material.

It will be understood that the resolution of the apparatus and the process, that is, the smallest feature size that may be created, is related to the particle size of the particulate material P. The particles may be regular or irregular in shape, may be uniform or non-uniform in size, and may have variable aspect ratios. For example, the particles may take the form of small spheres or granules, or may be shaped like small rods or fibers.

The composition of the particulate material P, including its chemistry and microstructure, may be selected as desired to suit a particular application. For example, the particulate material P may be metallic, ceramic, polymeric, and/or organic. Mixtures of different compositions may be used.

The particulate material may be "fusible", meaning it is capable of consolidation into a mass upon further processing, such as sintering via application of heat and/or pressure. For example, fusibility is a characteristic of many available ceramic and metallic powders.

The binder B comprises a material which is radiant-energy curable and which is capable of adhering or binding together the particulate material P in the cured state. As used herein, the term "radiant-energy curable" refers to any material which solidifies in response to the application of radiant energy of a particular frequency and energy level. For example, the binder B may comprise a known type of photopolymer resin containing photo-initiator compounds functioning to trigger a polymerization reaction, causing the resin to change from a liquid state to a solid state. Alternatively, the binder B may comprise a material which contains a solvent that may be evaporated out by the application of radiant energy. The uncured binder B may be provided in solid, liquid, or vapor form.

The composition of the binder B may be selected as desired to suit a particular application. Mixtures of different compositions may be used.

The binder B may be selected to have the ability to out-gas or burn off during further processing, such as the sintering process described above.

Examples of the operation of the apparatus 10 will now be described in detail with reference to FIGS. 1-3. It will be understood that, as a precursor to producing a component 76 using the apparatus 10, the component 76 is software modeled as a stack of planar layers arrayed along the Z-axis. Depending on the type of curing method used, each layer may be divided into a grid of pixels. The actual component 76 may be modeled and/or manufactured as a stack of dozens or hundreds of layers. Suitable software modeling processes are known in the art.

To begin the build process, the apparatus 10 is positioned to define a selected layer increment. For example, the build platform 14 may be positioned below the worksurface 30 by a selected layer increment. The layer increment affects the speed of the additive manufacturing process and the resolution of the component 76. The layer increment can be variable, with a larger layer increment being used to speed the process in portions of a component 76 not requiring high accuracy, and a smaller layer increment being used where higher accuracy is required, at the expense of process speed.

In one exemplary embodiment, the particulate material supply 18 is used to deposit particulate material P, without binder, over the build platform 14. For example, the elevator 40 of the supply container 38 may be raised to push particulate material P through the supply opening 34, exposing it above the worksurface 30. The recoater 44 is moved across the worksurface 30 to spread the raised particulate material P horizontally over the build platform 14 and to form a level surface. Any excess particulate material P drops into the overflow container 20 as the recoater 44 passes from left to right. Subsequently, the recoater 44 may be moved back to a starting position. The leveled particulate material P may be referred to as a "build layer" and the exposed upper surface thereof may be referred to as a "build surface". Other known types of particulate material supply utilize a recoater arm which moves above the build platform, not relying on a worksurface to ride upon.

Optionally, different layers may comprise two or more particulate materials. For example, one layer may comprise particulate material of a first composition, and a second layer may comprise particulate material of a second composition. The different particulate materials may be provided, for example, by providing one or more additional particulate material supply containers 78, as seen in FIG. 1.

Figure 4:
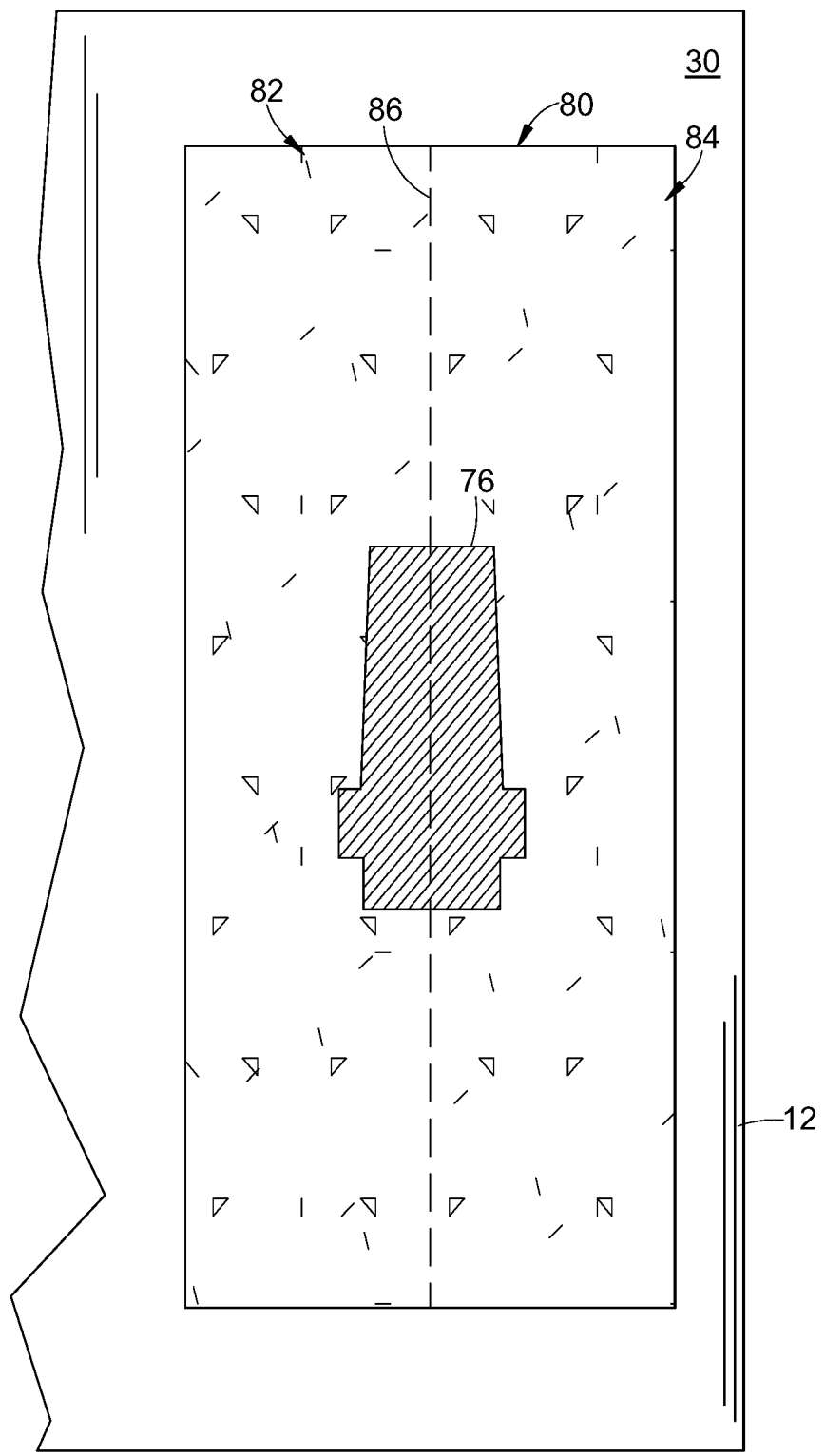
FIG. 4 is a schematic diagram showing a pattern of particulate material applied to a build plate.

Optionally, any of the layers may comprise two or more particulate materials. FIG. 4 illustrates an exemplary layer 80 showing a cross-section of the component 76 superimposed thereupon. The layer 80 is divided into a first section 82 including particulate material of a first composition, and a second section 84 including particulate material of a second composition. A dashed line 86 indicates the division between the two sections 82, 84. The shape, size, and number of sections, and number of different particulate material compositions within a given layer may be arbitrarily selected. If multiple particulate materials are used in one layer, then the deposition steps described above would be carried out for each section of the layer.

Next, binder B is applied over the particulate material P, using the binder applicator 22. For example, if a liquid binder B is used, it may be discharged from the spray nozzles 50 of the spraybar 48 as the spraybar is traversed across the build surface.

Two options are possible in the application of the binder B. For either option, the surface area of the binder B applied is larger than the surface area of the cross-section that will eventually be cured. In the first option, binder B is applied over the surface of the exposed particulate material P in a selected area 88 (FIG. 2) that is generally uniform over the majority of the platform 14, and may cover the entire platform 14. In order to avoid waste of material and unnecessary cleanup, the selected area 88 may be somewhat smaller than the size of the build chamber 16. With this option there would generally be no effort to use the binder B to conform to, or to define, the perimeter of the component 76 being built.

In a second option, binder B would be applied over the surface of the exposed particulate material P in a selected area 90 tailored to the cross-section of the component 76 being built, for the specific layer under consideration. For example, the selected area 90 may be a regular shape such as a polygon having minimum dimensions slightly larger than the maximum dimensions of the component cross-sectional area in each axis. In another example, the selected area 90 may be an arbitrary or irregular shape generally following the outermost perimeter of the component cross-section, with an additional marginal boundary 92. This shape may be described as roughly approximating the shape of the component cross-section.

The second option may be referred to as a "gross" or "rough" or "coarse" application of binder, these terms referring to the level of accuracy achieved. It will be understood that this gross, rough, or coarse application of binder may be achievable using a simple spraybar apparatus as described above and need not require the use of a conventional printhead apparatus. Alternatively, this gross, rough, or coarse application of binder may be achieved using a conventional printhead apparatus (not shown).

Optionally, different layers may comprise two or more binders of different compositions. For example, one layer may comprise a binder of a first composition, and a second layer may comprise a binder of a second composition. The different binders may be provided, for example, by providing one or more additional binder reservoirs 94 coupled to the spraybar 48, as seen in FIG. 1. Additional options for the use of two different binders are described in more detail below.

In another exemplary embodiment, the particulate material P would be pre-mixed with binder B, then loaded into the particulate material supply 18, and the particulate material supply 18 would be used to deposit the mixture of the particulate material and the binder B over the build platform 14. As used herein, the term "pre-mixed" refers to a mechanical mixture of particulate material and binder, as well as to particulate material in which the constituent particles have been coated with a layer of a binder. As noted above, different layers may have different particulate material compositions, or individual layers may include multiple sections with different particulate material compositions.

Once the particulate material P and binder B have been applied, the radiant energy apparatus 24 is used to cure a two-dimensional cross-section or layer of the component 76 being built.

Where a projector 56 is used as shown in FIG. 1, the projector 56 projects a patterned image 64 representative of the cross-section of the component 76 on the surface of the binder-coated particulate material P. Exposure to the radiant energy cures and solidifies the pattern in the binder B. This type of curing is referred to herein as "selective" curing. Another layer increment is defined, for example by the platform 14 being moved vertically downward by the layer increment, and particulate material P and binder B are applied as described above. The projector 56 again projects a patterned image 64. Exposure to the radiant energy cures and solidifies the pattern in the binder B and joins it to the previously-cured layer below. This cycle of incrementing a layer, applying particulate material P and binder B, and then curing the binder B is repeated until the entire component 76 is complete.

Where a scanned beam apparatus is used instead of a projector, the radiant energy source 68 emits a beam 72 and the beam steering apparatus 70 is used to selectively cure the binder B by steering a focal spot of the build beam 72 over the exposed particulate material P and binder B in an appropriate pattern. Exposure to the radiant energy cures and solidifies the pattern in the binder B.

Another layer increment is defined, for example by the build platform 14 being moved vertically downward by the layer increment, and another layer of particulate material P and binder B is applied in a similar thickness. The radiant energy source 68 again emits a build beam 72 and the beam steering apparatus 70 is used to steer the focal spot of the build beam 72 over the exposed particulate material P in an appropriate pattern. The exposed layer of the particulate material P is exposed to the radiant energy which cures and solidifies the pattern in the binder B and joins it to the previously-cured layer below. This cycle of incrementing a layer, applying particulate material P and binder B, and then curing the binder B is repeated until the entire workpiece W is complete.

Optionally, a scanned beam apparatus may be used in combination with a projector. For example, a scanned beam apparatus may be used to apply radiant energy (in addition to that applied by the projector) by scanning one or multiple beams over the surface of the exposed particulate material P. This may be concurrent or sequential with the use of the projector.

It will be understood that, unlike powder bed metal processes, the process described above does not involve re-melting of the previously cured layer. For some types of binders B, percentage of cure of the binder B depends upon how much radiant energy is applied. For example, the binder B may exhibit an exponential characteristic in a curing versus energy curve. Accordingly, when a multi-layer component is made using this type of binder B, the energy output of the radiant energy apparatus 24 may be carefully selected to partially cure or "under-cure" an underlying layer, with the expectation that when the subsequent layer is applied, the energy from that next layer will complete the curing of the lower layer.

The accuracy of either process, defined as the smallest component feature size which can be produced, is primarily related to the particle size of the particulate material P and the resolution of the projector 56 or scanned beam apparatus 67.

Either curing method (projector or scanned) results in a component 74 in which the particulate material P is held in a solid shape by the cured binder B. if a polymeric binder B is used, the result of the multilayer process is a cured filled polymer with a very high percentage of fill. This may be referred to as a "green" component. This green component may be usable as an end product for low-temperature conditions.

Subsequent to the curing step, the green component may be removed from the build chamber 16, and excess particulate material P and/or uncured binder B may be removed and potentially reused.

If the end product is intended to be purely ceramic or metallic, the component 76 may be treated to conventional sintering process to burn out the binder B and to consolidate the ceramic or metallic particles. Optionally, a known infiltration process may be carried out during or after the sintering process, in order to fill voids in the component with a material having a lower melting temperature than the particulate material P. The infiltration process improves component physical properties.

The build process described above may be modified by the incorporation of multiple binders of different compositions having different curing processes. As used herein, the term "different curing process" refers to differences in any aspect of a curing process, such as curing modality or the process parameters for a particular modality. For example, first and second binders may be provided, with the first being curable using a first wavelength of radiant energy, and the second binder being curable using a second wavelength of radiant energy. As another example, first and second binders may be provided, with the first being curable using a particular wavelength of radiant energy, and the second binder being curable by exposure to high temperature (e.g. in heated air). In order to selectively cure one of the binders without curing the other binder, the radiant energy apparatus 24 may be configured to apply radiant energy at different wavelengths, or more than one radiant energy apparatus 24 may be provided in the apparatus 10, or a radiant energy apparatus 24 as described above may be combined with another type of curing apparatus intended to produce non-selective or uniform curing results, such as radiant heating elements, quartz lamps, etc. These types of curing apparatus do not apply radiant energy in a pattern as described above but rather subjective the entire build chamber 16 to radiant energy.

The different binders may be incorporated as part of the binder application steps described above. Alternatively, either or both of the binders may be incorporated as part of a premix as described above.

At least one of the binders is provided by a pre-mixture or is applied before a first curing step is carried out. The remaining binders may be applied before or after curing steps are carried out.

At least one of the binders is selectively cured as described above. The remaining binders can be selectively cured or uniformly cured.

The use of two or more binders permits each binder to be tailored to a specific function. For example, the first binder may be used to help connect the particles that will form the final component, while the second binder may be used as a support structure to give the component strength through the build process.

The method described herein has several advantages over the prior art. In particular, it permits economically viable production of components with fine feature fidelity; provides freedom in the choice of materials; works at high speed; and has low cost. One specific advantage of the gross binder application process is that it should make it easier to reuse or recycle uncured particulate material in the areas that have not been sprayed with binder.

The foregoing has described a method for an additive manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of producing a component layer-by-layer, the method comprising:
    depositing a layer of particulate material over a build platform, the layer of particulate material covering a first area, and the layer of particulate material premixed with a first radiant-energy-curable binder;
    applying a second radiant-energy-curable binder upon the layer, the second radiant-energy-curable binder uniformly coating a selected sub-region of the first area;
    non-selectively curing the first radiant-energy-curable binder with a first application of a first radiant energy before or after applying the second radiant-energy-curable binder;
    selectively curing the second radiant-energy-curable binder in a second area of the layer with a second application of a second radiant energy, the second area located within the selected sub-region of the first area, the second area comprising a specific pattern that defines a geometry of a cross-sectional layer of the component, and the second application of the second radiant energy applied by projecting a pattern of light defined by a plurality of pixels, wherein the selected sub-region of the first area provides an additional marginal boundary around an outermost perimeter of the cross-sectional layer of the component without conforming to the perimeter of the second area of the cross-sectional layer; and
    repeating the steps of depositing, applying, non-selectively curing, and selectively curing for respective ones of a plurality of cross-sectional layers of the component.

2. The method of claim 1, wherein the additional marginal boundary is realized by a coarse application of the radiant-energy-curable binder using a spray bar.

3. The method of claim 1, wherein the selected sub-region comprises a majority of the first area.

4. The method of claim 1, wherein the particulate material in at least a first one or more of the layers has a first composition and the particulate material in at least a second one or more of the layers has a second composition, the first composition differing from the second composition.

5. The method of claim 1, wherein at least one of the layers comprises a first portion and a second portion, and wherein the particulate material in the first portion has a first composition and the particulate material in the second portion has a second composition, the first composition differing from the second composition.

6. The method of claim 1, wherein the first application of the first radiant energy comprises scanning at least one build beam comprising a first wavelength over the layer of the particulate material, and wherein the second application of the second radiant energy has a second wavelength that differs from the first wavelength.

7. The method of claim 1, wherein the first application of the first radiant energy comprises projecting non-patterned light having a first wavelength, and wherein the second application of the second radiant energy has a second wavelength that differs from the first wavelength.

8. The method of claim 1, comprising:
    applying the second radiant-energy-curable binder upon the layer using one or more spray nozzles.

9. The method of claim 1, wherein the particulate material comprises a mixture of a plurality of particulate materials.

10. The method of claim 1, comprising:
sintering the component to burn out at least the second radiant-energy-curable binder and thereby consolidate the particulate material.

11. The method of claim 10, comprising:
infiltrating a lower-melting-temperature material into the component during or after sintering.

12. A method for producing a component layer-by-layer, the method comprising:
depositing a layer of particulate material over a build platform, the layer of particulate material covering a first area, and the layer of particulate material premixed with a first radiant-energy-curable binder;
applying a second radiant-energy-curable binder upon the layer using one or more spray nozzles, the second radiant-energy-curable binder uniformly coating a selected sub-region of the first area;
curing the first radiant-energy-curable binder with a first application of a first radiant energy before or after applying the second radiant-energy-curable binder;
selectively curing the second radiant-energy-curable binder in a second area of the layer with a second application of a second radiant energy, the second area located within the selected sub-region of the first area, the second area comprising a specific pattern that defines a geometry of a cross-sectional layer of the component, and the second application of the second radiant energy applied by projecting a pattern of light defined by a plurality of pixels, wherein the selected sub-region of the first area provides an additional marginal boundary around an outermost perimeter of the cross-sectional layer of the component without conforming to the perimeter of the second area of the cross-sectional layer; and
repeating the steps of depositing, applying, and selectively curing for respective ones of a plurality of cross-sectional layers of the component.

13. The method of claim 12, wherein the additional marginal boundary is realized by a coarse application of the second radiant-energy-curable binder using a spray bar.

14. The method of claim 12, wherein the selected sub-region comprises a majority of the first area.

15. The method of claim 12, wherein the particulate material in at least a first one or more of the layers has a first composition and the particulate material in at least a second one or more of the layers has a second composition, the first composition differing from the second composition.

16. The method of claim 12, wherein at least one of the layers comprises a first portion and a second portion, and wherein the particulate material in the first portion has a first composition and the particulate material in the second portion has a second composition, the first composition differing from the second composition.

17. The method of claim 12, comprising:
applying the second application of the second radiant energy by scanning the pattern of light over the layer of the particulate material, the pattern of light provided by at least one build beam.

18. The method of claim 12, comprising:
curing the first radiant-energy-curable-binder by applying additional radiant energy, the additional radiant energy provided by scanning at least one build beam over the layer of the particulate material or by exposing the layer of particulate material to a radiant heating element.

19. The method of claim 12, where the particulate material contains a mixture of more than one material.

20. The method of claim 12, comprising:
sintering the component to burn out at least one of: the first radiant-energy-curable binder and the second radiant-energy curable binder, and thereby consolidate the particulate material.

21. The method of claim 20, comprising:
infiltrating a lower-melting-temperature material into the component during or after sintering.

22. A method for producing a component layer-by-layer, the method comprising:
forming a layer of particulate material over a build platform, the layer of particulate material covering a first area, wherein as formed, the layer of particulate material comprises a first binder and a second binder upon the layer;
curing the first binder using a first curing process and curing the second binder using a second curing process, wherein at least one of the first binder and the second binder comprises a radiant-energy-curable binder, the radiant-energy-curable binder uniformly coating a selected sub-region of the first area, wherein curing the first binder and/or curing the second binder comprises curing the radiant-energy-curable binder; and
repeating the steps of depositing, applying, and selectively curing for respective ones of a plurality of cross-sectional layers of the component;
wherein curing the radiant-energy-curable binder comprises selectively curing a second area of the layer with an application of radiant energy, the second area located within the selected sub-region of the first area, the second area comprising a specific pattern that defines a geometry of at least a portion of a cross-sectional layer of the component, and the application of radiant energy applied by projecting a pattern of light defined by a plurality of pixels, wherein the selected sub-region of the first area provides an additional marginal boundary around an outermost perimeter of the at least a portion of the cross-sectional layer of the component without conforming to the perimeter of the second area of the cross-sectional layer.

23. The method of claim 22, wherein the additional marginal boundary is realized by a coarse application of the radiant-energy-curable binder using a spray bar.

24. The method of claim 22, wherein at least one of the first binder and the second binder are premixed with the particulate material.

25. The method of claim 22, wherein the selected sub-region comprises a majority of the first area.

26. The method of claim 22, comprising:
curing the first binder prior to applying the second binder.

27. The method of claim 22, comprising:
curing the first binder and the second binder sequentially.

28. The method of claim 22, wherein the particulate material in at least a first one or more of the layers has a first composition and the particulate material in at least a second one or more of the layers has a second composition, the first composition differing from the second composition.

29. The method of claim 22, wherein at least one of the layers comprises a first portion and a second portion, and wherein the particulate material in the first portion has a first composition and the particulate material in the second portion has a second composition, the first composition differing from the second composition.

30. The method of claim 22, comprising:
applying the application of radiant energy by scanning the pattern of light over the layer of the particulate material, the pattern of light provided by at least one build beam.

31. The method of claim 22, comprising:
applying additional radiant energy by scanning at least one build beam over the layer of the particulate material.

32. The method of claim 22, wherein the particulate material comprises a mixture of a plurality of particulate materials.

33. The method of claim 22, comprising:
sintering the component to burn out the radiant-energy-curable binder and consolidate the particulate material.

34. The method of claim 33, comprising:
infiltrating a lower-melting-temperature material into the component during or after sintering.

* * * * *